(12) United States Patent
Pattnaik et al.

(10) Patent No.: US 12,335,789 B2
(45) Date of Patent: Jun. 17, 2025

(54) METHOD AND NETWORK NODE FOR SESSION CONTROL

(71) Applicant: Telefonaktiebolaget LM Ericsson (publ), Stockholm (SE)

(72) Inventors: Debashish Pattnaik, Shanghai (CN); Mikael Klein, Huddinge (SE); Erqun Sun, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 17/776,689

(22) PCT Filed: Nov. 18, 2019

(86) PCT No.: PCT/CN2019/119175
§ 371 (c)(1),
(2) Date: May 13, 2022

(87) PCT Pub. No.: WO2021/097608
PCT Pub. Date: May 27, 2021

(65) Prior Publication Data
US 2022/0408316 A1   Dec. 22, 2022

(51) Int. Cl.
*H04W 12/06* (2021.01)
*H04L 65/1016* (2022.01)
(Continued)

(52) U.S. Cl.
CPC ......... *H04W 28/26* (2013.01); *H04L 65/1016* (2013.01); *H04W 12/06* (2013.01); *H04W 76/30* (2018.02)

(58) Field of Classification Search
CPC ..... H04W 28/26; H04W 12/06; H04W 76/30; H04L 65/1016; H04L 47/72;
(Continued)

(56) References Cited

U.S. PATENT DOCUMENTS 7,315,826 B1 *   1/2008   Guheen ............. G06Q 30/0201
                                                  705/7.29
10,600,414 B1 *  3/2020   Wang ..................... G10L 15/08
(Continued)

FOREIGN PATENT DOCUMENTS

CN   101902405 A   12/2010

OTHER PUBLICATIONS

3GPP; Technical Specification Group Services and System Aspects; IP Multimedia (IM) Subsystem—Stage 2 (3G TS 23.228 version 2.0.0)—Date (Mar. 2001) (Year: 2001).*
(Continued)

*Primary Examiner* — Lan-Huong Truong
(74) *Attorney, Agent, or Firm* — Sage Patent Group

(57) ABSTRACT

The present disclosure provides a method in a network node for session control. The method includes: receiving a request for resource reservation for a first session initiated from a user device with a first keyword associated with a first priority; releasing a resource for a second, ongoing session initiated from the user device with a second keyword associated with a second priority lower than the first priority; and reserving a resource for the first session.

20 Claims, 15 Drawing Sheets

(51) Int. Cl.
*H04W 28/26* (2009.01)
*H04W 76/30* (2018.01)

(58) Field of Classification Search
CPC ... H04L 65/1066; H04L 67/02; H04L 67/141;
G06F 17/30
See application file for complete search history.

(56) References Cited

U.S. PATENT DOCUMENTS

| | | | | |
|---|---|---|---|---|
| 2007/0081459 A1* | 4/2007 | Segel | ................... | H04L 47/724 |
| | | | | 370/254 |
| 2009/0202056 A1* | 8/2009 | Raghav | ................... | H04M 3/58 |
| | | | | 379/142.04 |
| 2009/0310484 A1* | 12/2009 | Sisalem | .................. | H04L 69/40 |
| | | | | 370/352 |

OTHER PUBLICATIONS

International Search Report and Written Opinion of the International Searching Authority for PCT International Application No. PCT/CN2019/119175 dated Aug. 13, 2020.

* cited by examiner

METHOD AND NETWORK NODE FOR SESSION CONTROL

CROSS REFERENCE TO RELATED APPLICATION

This application is a 35 U.S.C. § 371 national stage application of PCT International Application No. PCT/CN2019/119175 filed on Nov. 18, 2019, the disclosure and content of which is incorporated by reference herein in its entirety.

TECHNICAL FIELD

The present disclosure relates to communication technology, and more particularly, to a method and a network node for session control.

BACKGROUND

An Internet Protocol (IP) Multimedia Sub-system (IMS) network is based on explicit Session Initiation Protocol (SIP) signaling methods. With the IMS network, a Digital Assistant (DA) can be provided as an Over-The-Top (OTT) service. A DA can enable a user to invoke various services, including e.g., telephony services, using instructions, e.g., voice commands. For example, a user of a DA-enabled smart device, or User Equipment (UE), can say a voice command like "Digital Assistant, call Alice" or "Digital Assistant, I want a pizza". In this example, "Digital Assistant" in the voice command is a predefined word, referred to as "keyword" herein, indicating that the user is providing an instruction to the DA. The UE can then forward the voice command to a DA platform for interpreting and processing.

FIG. 1 shows an exemplary system for implementing a DA service. The system includes a DA Application Server (AS), a DA Media Function (MF), a DA keyword detect function, a DA leg handler, a gateway control function, a DA media control function, and a DA service exposure framework. The DA AS, the DA keyword detect function, the DA leg handler, the gateway control function, the DA media control function, and the DA service exposure framework may be located in an IMS domain, while the DA MF may be located in a DA platform. The DA platform supports Real-time Transport Protocol (RTP) towards an exposure function (which interfaces with the DA service exposure framework) in the IMS domain and Hyper Text Transfer Protocol (HTTP)/Representational State Transfer (REST) towards a gateway (GW) function (which interfaces with the GW control function) in the IMS domain. The DA AS provides communication services on behalf of users. The DA AS is provided with a SIP' interface towards the DA service exposure framework, such that SIP requests may be initiated from the DA exposure framework on behalf of the DA platform. The DA AS is further provided with a media control interface (Mp') towards the DA leg handler for control of a DA leg handling. The DA AS is further provided with an Rf interface towards a Charging Data Function (CDF) for accounting purpose and a IMS Service Control Interface (ISC) interface towards an IMS core. The DA leg handler may provide DA leg handling towards the DA platform (or in particular DA-MF) and the DA media control function. The DA media control function provides media control functionality, e.g., switching media between the DA platform and a UE in accordance with instructions from the DA leg handler. The DA keyword detection function provides keyword detection functionality that detects a predefined keyword from a UE.

SUMMARY

Conventionally, a user can only use one single keyword predefined by a network operator to invoke various communication services, which lacks flexibility in session control.

It is an object of the present disclosure to provide a method and a network node for session control.

According to a first aspect of the present disclosure, a method in a network node for session control is provided. The method includes: receiving a request for resource reservation for a first session initiated from a user device with a first keyword associated with a first priority; releasing a resource for a second, ongoing session initiated from the user device with a second keyword associated with a second priority lower than the first priority; and reserving a resource for the first session.

In an embodiment, the method may further include: receiving a configuration of a set of user-defined keywords each associated with a priority. The first keyword and the second keyword can be included in the set of user-defined keywords.

In an embodiment, the configuration may further indicate a validity period for each of the set of user-defined keywords. The method may further include: verifying that the first keyword is valid based on the validity period for the first keyword upon receiving the request.

In an embodiment, the resource for the second session may be released in response to determining that there is no sufficient resource to be reserved for the first session.

In an embodiment, each of the first keyword and the second keyword may be derived from a voice command.

According to a second aspect of the present disclosure, a method in a network node for session control is provided. The method includes: receiving a request for establishing a session initiated from a user device with a keyword; determining whether the request conforms to a service profile associated with the keyword; and establishing, or enabling establishment of, the session when the request conforms to the service profile.

In an embodiment, the method may further include: receiving a configuration of a set of user-defined keywords each associated with a service profile specifying one or more services allowed to be initiated with that user-defined keyword. The keyword may be included in the set of user-defined keywords.

In an embodiment, the configuration may further indicate a password associated with each of the set of user-defined keywords. The method may further include: authenticating the request based on the password.

In an embodiment, the configuration may further indicate a validity period for each of the set of user-defined keywords. The method may further include: verifying that the keyword is valid based on the validity period of the keyword upon receiving the request.

In an embodiment, the keyword may be derived from a voice command.

According to a third aspect of the present disclosure, a network node is provided. The network node includes a communication interface, a processor and a memory. The memory stores instructions executable by the processor whereby the network node is operative to perform the method according to the above first or second aspect.

According to a fourth aspect of the present disclosure, a computer readable storage medium is provided. The computer readable storage medium has computer program instructions stored thereon. The computer program instructions, when executed by a processor in a network node, cause the network node to perform the method according to the above first or second aspect.

With the embodiments of the present disclosure, a plurality of keywords can be defined. Each keyword can be associated with a priority, such that a resource for a session initiated with a low-priority keyword can be released and reallocated to a session initiated with a high-priority keyword, thereby achieving an optimized resource utilization. In another example, each keyword can be associated with a service profile, such that a request for a session initiated with a keyword can be accepted or rejected based on the service profile, thereby achieving a more flexible keyword based session control.

BRIEF DESCRIPTION OF THE DRAWINGS

The above and other objects, features and advantages will be more apparent from the following description of embodiments with reference to the figures, in which.

DETAILED DESCRIPTION

In the following, references in the specification to "one embodiment", "an embodiment", "an example embodiment" and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
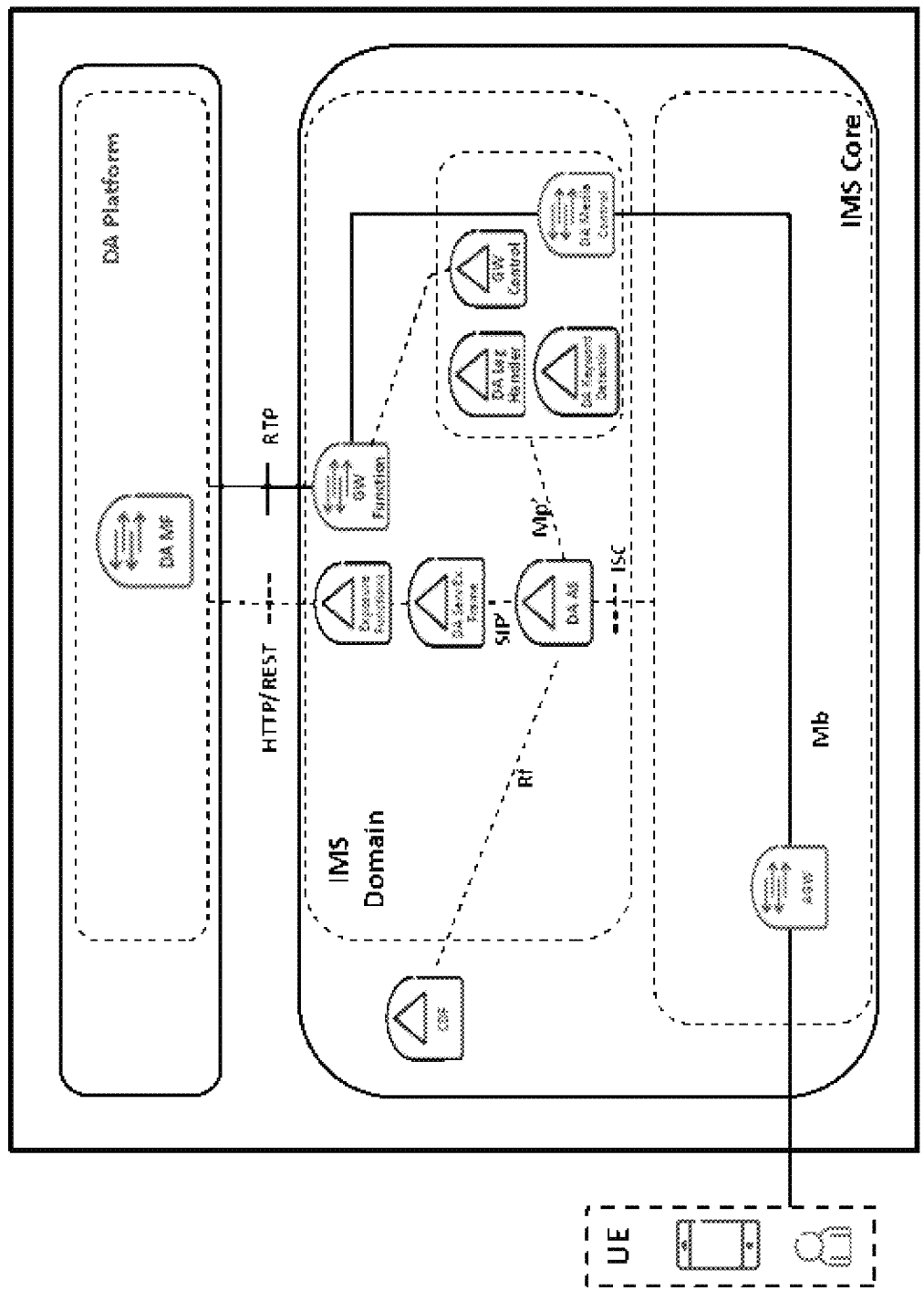
FIG. 1 is a schematic diagram showing an exemplary system for implementing a DA service.
Figure 2:
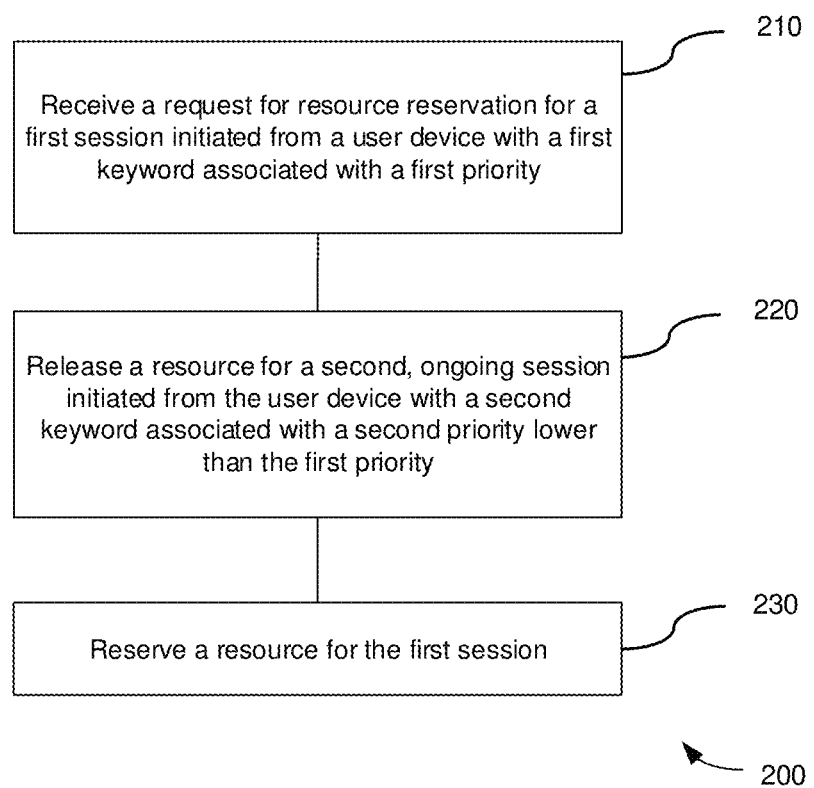
FIG. 2 is a flowchart illustrating a method for session control according to an embodiment of the present disclosure.

FIG. 2 is a flowchart illustrating a method 200 for session control according to an embodiment of the present disclosure. The method 200 can be performed at a network node, e.g., a DA MF in FIG. 1.

At block 210, a request for resource reservation for a first session is received, e.g., from a DA AS in FIG. 1. The first session is initiated from a user device with a first keyword associated with a first priority.

At block 220, a resource for a second, ongoing session is released. The second session is initiated from the user device with a second keyword associated with a second priority lower than the first priority. For example, in the block 220, the resource for the second session is released in response to determining that there is no sufficient resource to be reserved for the first session, e.g., in an event of network congestion.

At block 230, a resource is reserved for the first session.

In an example, the first keyword and the second keyword can be included in a set of user-defined keywords. For example, prior to the block 210, a configuration of the set of user-defined keywords can be received, e.g., from a DA AS in FIG. 1. Each of the set of user-defined keywords can be associated with a priority. The first priority and the second priority can be indicated in the configuration.

In an example, the configuration may further indicate a validity period for each of the set of user-defined keywords. Accordingly, upon receiving the request in the block 210, it can be verified that the first keyword is valid based on the validity period for the first keyword. If the first keyword is not valid at this time, the request can be rejected.

In an example, each of the first keyword and the second keyword can be derived from a voice command.

The method 200 will be explained in further detail below with reference to FIG. 3 and FIGS. 4A-4E.

Figure 3:
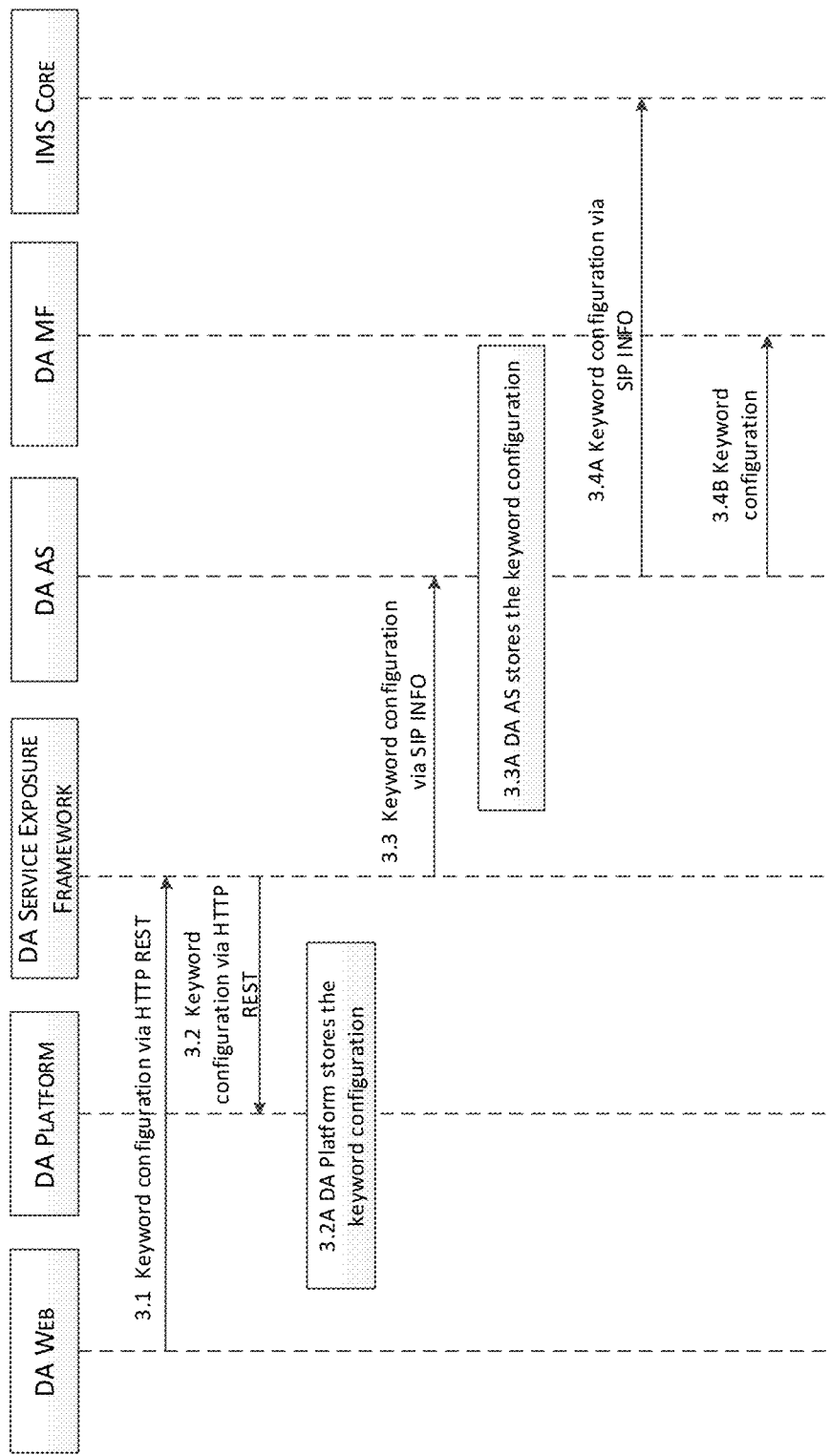
FIG. 3 is a sequence chart showing a keyword configuration process that can be used with the method shown in FIG. 2.

FIG. 3 is a sequence chart showing an example of a keyword configuration process that can be used with the method 200.

In this example, a user (e.g., owner, referred to as "master user" hereinafter) of a DA-enabled smart device has registered to an IMS network. The master user can define a set of keywords of his/her choice and configure each keyword with a priority. The master user can assign one or more of these keywords to other users (referred to as "guest users" hereinafter). The master user may also configure each keyword with a validity period, so that a DA platform may reject any instructions containing a particular keyword once its validity period has expired. The master user can register the keywords and their respective priorities and validity periods to the DA platform via an interface (referred to as "DA Web") to a DA service exposure framework. The master user can access the DA Web using the smart device or any other appropriate web-enabled device.

As an example, Table 1 below illustrates a list of keywords created/configured by the master user, as well as their corresponding priorities and validity periods. One or more of these keywords may be assigned or distributed by the master user to guest users.

TABLE 1

Keyword Configuration

| Keyword | Priority | Validity Period (seconds) |
| --- | --- | --- |
| "Digital Assistant" | 0 (Highest) | Infinite |
| "Ericsson" | 3 | 3600 |
| "Elsa" | 6 | 60 |
| "Alpha" | 9 (Lowest) | 50 |

At 3.1, the DA Web sends the keyword configuration, including the keywords and their respective priorities and validity periods, as shown in Table 1 to a DA service exposure framework via HTTP REST. At 3.2, the DA service exposure framework sends the keyword configuration to a DA platform via HTTP REST. At 3.2A, the DA platform stores the keyword configuration. At 3.3, the DA service exposure framework sends the keyword configuration to a DA AS via SIP INFO. At 3.3A, the DA AS stores the keyword configuration in order to prioritize resources and services to a user providing an instruction containing a high-priority keyword. At 3.4A, the DA AS sends the keyword configuration to an IMS core via SIP INFO. At 3.4B, the DA AS sends the keyword configuration to a DA MF via an H.248 Service Change Request. Then, the DA platform can invoke various services based on voice instructions from a user using any of the defined keywords.

FIGS. 4A-4E are sequence charts showing a session establishment process based on the method 200, following the keyword configuration process shown in FIG. 3. The steps in FIGS. 4A-4E describe how a user may establish a voice call session with another user using a user-defined keyword and how a priority may apply in session control.

Figure 4A:
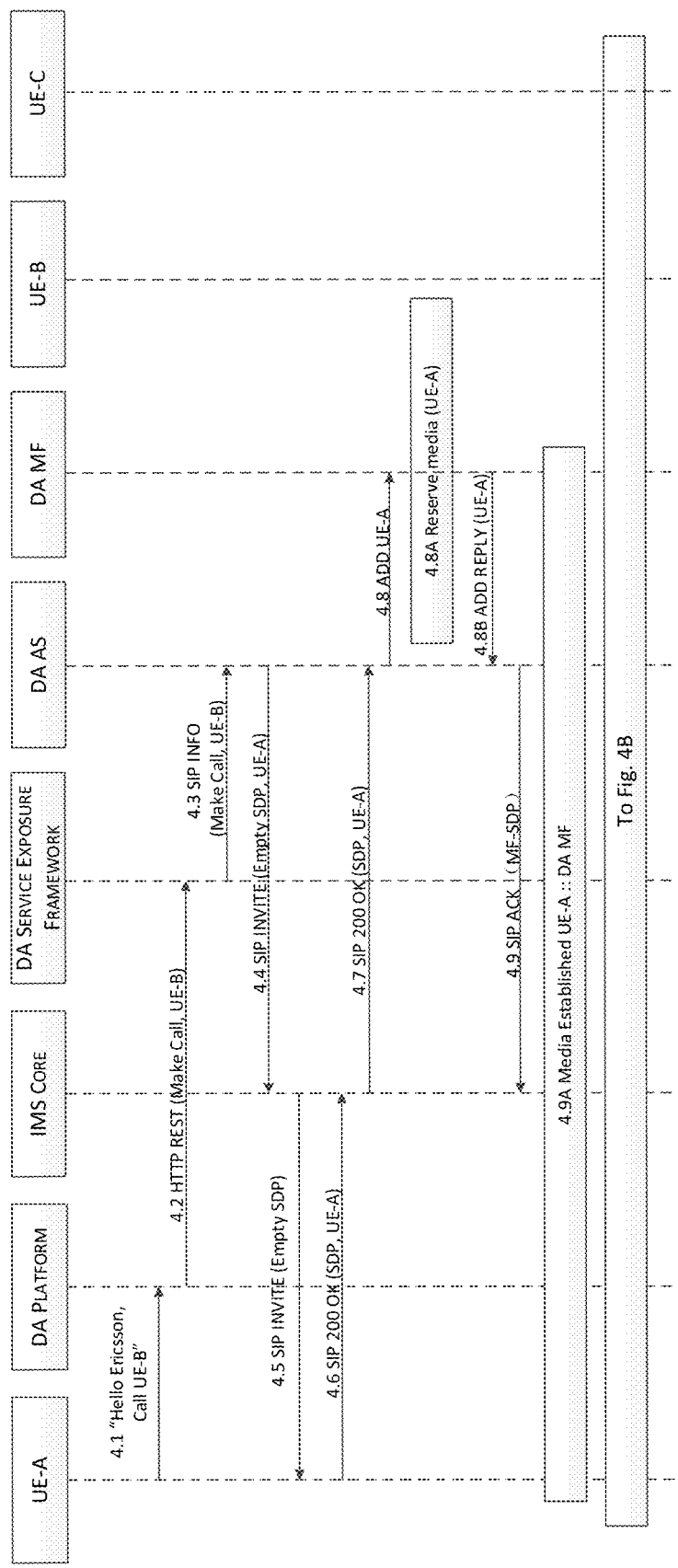
FIGS. 4A-4E are sequence charts showing a session establishment process based on the method shown in FIG. 2.

As shown in FIG. 4A, at 4.1, the smart device (which is a calling UE and denoted here as UE-A) receives from a user (e.g., a guest user) a voice command of "Hello Ericsson, Call UE-B" (here UE-B refers to a called UE), and transmits the voice command to the DA platform. The voice command may be carried over a media channel between the UE-A and the DA platform. The DA platform, which is already aware of the keyword configuration, detects the keyword "Ericsson". The DA platform translates the voice command into a text function and maps the voice command to a text and/or a JavaScript Object Notation (JSON) format. From a perspective of the IMS DA service, the DA platform may act as a Web Real Time Communication (WebRTC) client. The text is then forwarded to the DA service exposure framework e.g., via HTTP/REST at 4.2. At 4.3, the DA service exposure framework sends a SIP INFO message including e.g., a telephone number of UE-B to the DA AS, instructing the DA AS to trigger a voice call to UE-B. At 4.4, the DA AS sends an empty SIP INVITE request, containing no SIP body of UE-A, to the IMS core. At 4.5, the IMS core forwards the empty SIP INVITE request to UE-A, requesting UE-A to send Session Description Protocol (SDP) details. At 4.6, UE-A responds to the request with a SIP 200 OK response, containing its own offered SDP media attributes. At 4.7, the IMS core forwards the SIP 200 OK response to the DA AS. At 4.8, the DA AS requests the DA MF to reserve a media resource for UE-A, e.g., via an ADD request. At 4.8A, the DA MF detects the keyword ("Ericsson"), checks its associated priority and validity period, e.g., from its local buffer, and reserves media resources for UE-A. At 4.8B, the DA MF responds with an ADD reply to the DA AS. At 4.9, the DA AS sends a SIP ACK message with a SDP answer to the IMS core. At 4.9A, a media channel between UE-A and the DA MF is established.

Figure 4B:
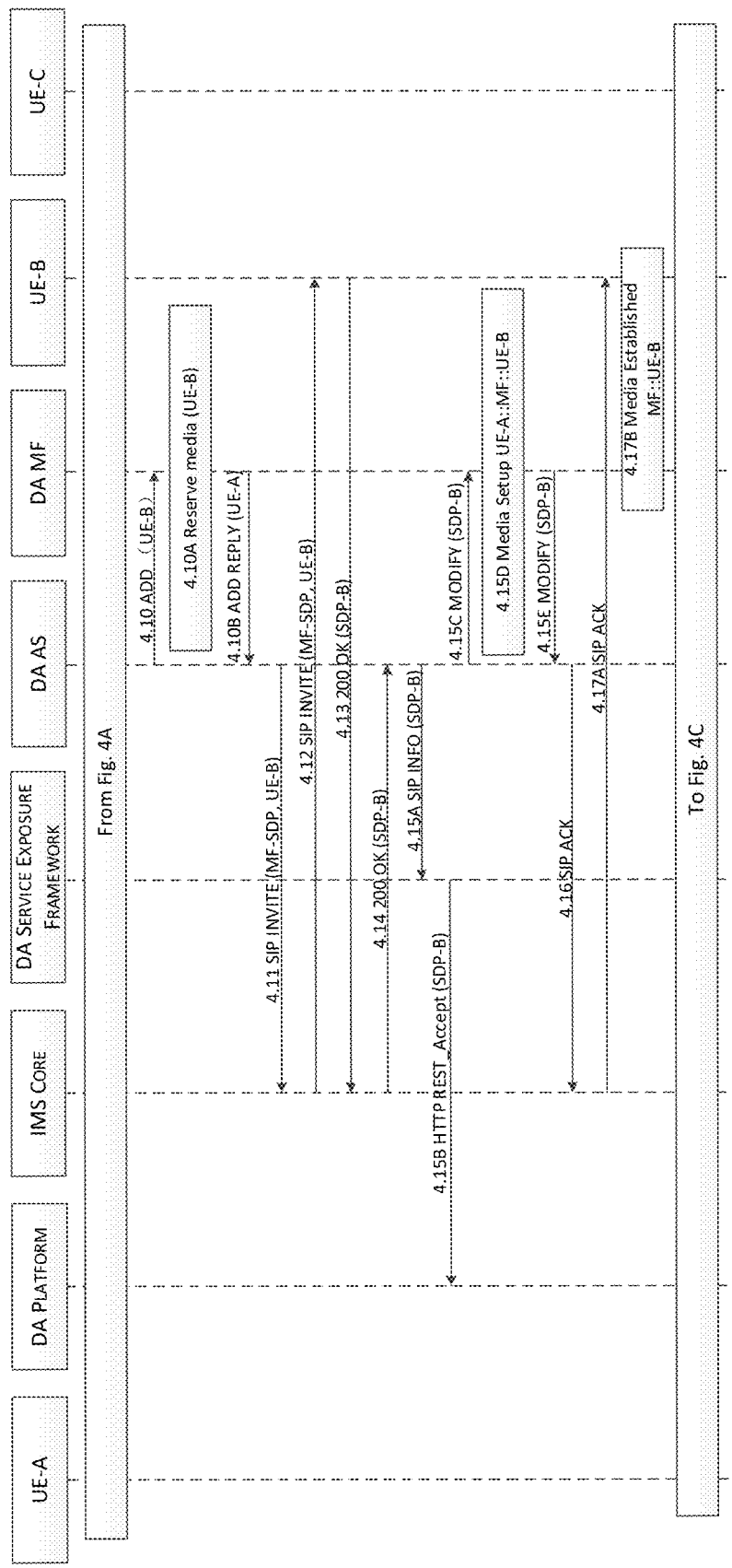

Turning to FIG. 4B, at 4.10, the DA AS request the DA MF to reserve a media resource for UE-B, e.g., via an ADD request. At 4.10A, the DA MF reserves a media resource for UE-B. At 4.10B, the DA MF responds with an ADD Reply to the DA AS, containing its local SDP. At 4.11, the DA AS triggers a SIP INVITE request towards the IMS core, containing information about UE-B and the SDP received from the DA MF. At 4.12, the IMS core forwards the SIP INVITE request along with the SDP offer to UE-B. At 4.13, UE B responds with a SIP 200 OK response containing its own SDP as an answer to the IMS core. At 4.14, the IMS core forwards the SIP 200 OK along with the SDP of UE-B to the DA AS. At 4.15A, the DA AS informs the DA service exposure framework about the supported SDP attributes of UE-B with a SIP INFO request. At 4.15B, the DA service exposure framework forwards the SDP attributes towards the DA platform using a REST/HTTP Accept message. At 4.15C, the DA AS sends a Modify request to the DA MF, requesting a media channel to be updated as per the remote SDP received from the IMS core at 4.14. At 4.15D, the media topology in the DA MF may be updated and keyword detection may be set to a silence mode. At 4.15E, the DA MF updates the media topology, then sets the media channel going towards the DA platform to be silenced and sends a Modify reply to the DA AS. At 4.16, the DA AS may inform the successful update of the media channel and completes the SIP dialogue to the IMS core with a SIP ACK message. At 4.17A, the IMS core forwards the SIP ACK to UE-B and establishes a signaling connection. At 4.17B, the Media channel between the DA MF and UE-B is established.

Figure 4C:
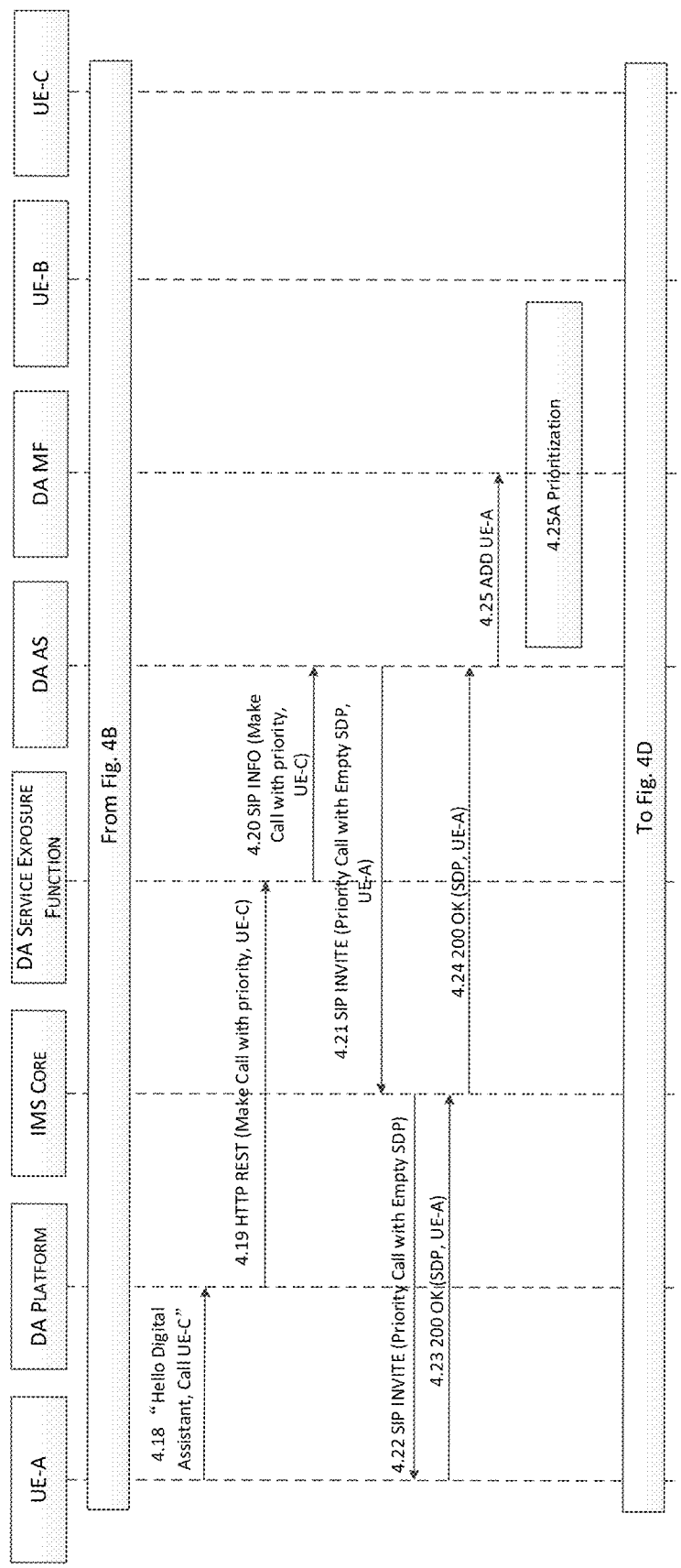

Turning to FIG. 4C, while the voice call between UE-A and UE-B is ongoing, the smart device receives from a user (e.g., a master user) a voice command of "Hello Digital Assistant, Call UE-C", and then sends the voice command to the DA platform at 4.18. The DA platform, which is already aware of the keyword configuration, detects the keyword "Digital Assistant", recognizes the keyword to be a high-priority keyword and hence prioritizes the master user over other users using lower priority keywords. The DA platform translates the voice command into a text function and maps the high-priority voice command to a text and/or JSON format. The text is then forwarded to the DA service exposure framework via a HTTP/REST API at 4.19, with a high priority to initiate a call towards UE-C. At 4.20, the DA service exposure framework sends a SIP INFO message including e.g., a telephone number of UE-C to the DA AS, instructing the DA AS to trigger a voice call to UE-C, with a high priority. At 4.21, the DA AS sends an empty SIP INVITE prioritized request to the IMS core, containing no SDP body of UE-A. At 4.22, the IMS core forwards the empty SIP INVITE prioritized request to UE-A, requesting it to send SDP details. At 4.23, UE-A responds to the request with a prioritized SIP 200 OK response, containing its own offered SDP media attributes and a priority tag. At 4.24, the IMS core forwards the prioritized SIP 200 OK response containing the SDP offer to the DA AS. At 4.25, the DA AS requests the DA MF to reserve a media resource for UE-A, e.g., via an ADD request, with high priority. At 4.25A, the DA MF detects the keyword ("Digital Assistant"), checks its associated priority and validity period, e.g., from its local buffer. If there is no sufficient resource for the call towards UE-C, e.g., in an event of network congestion, the DA MF may decide to release the resource for the call between UE-A and UE-B and reallocate the resource to the call towards UE-C, as the latter is initiated with a higher-priority keyword.

Figure 4D:
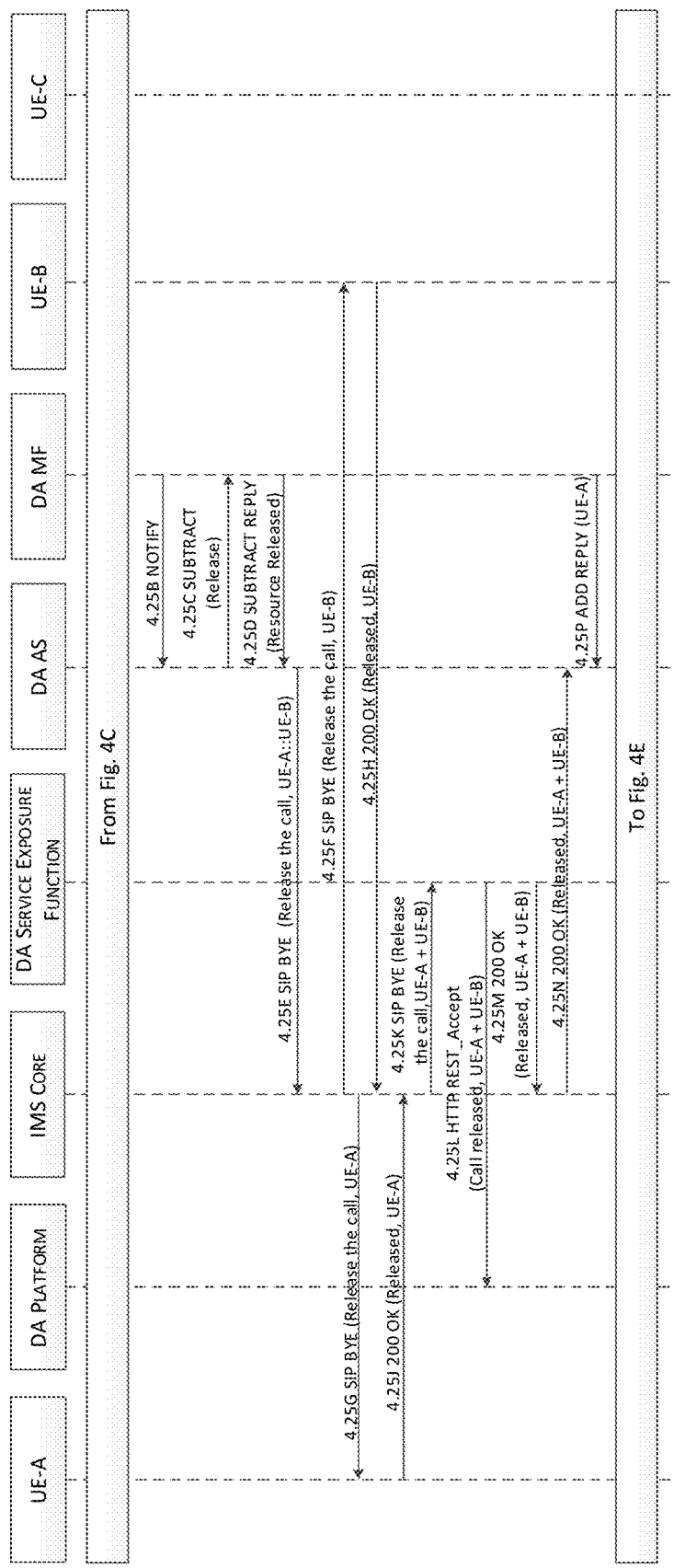
Figure 4E:
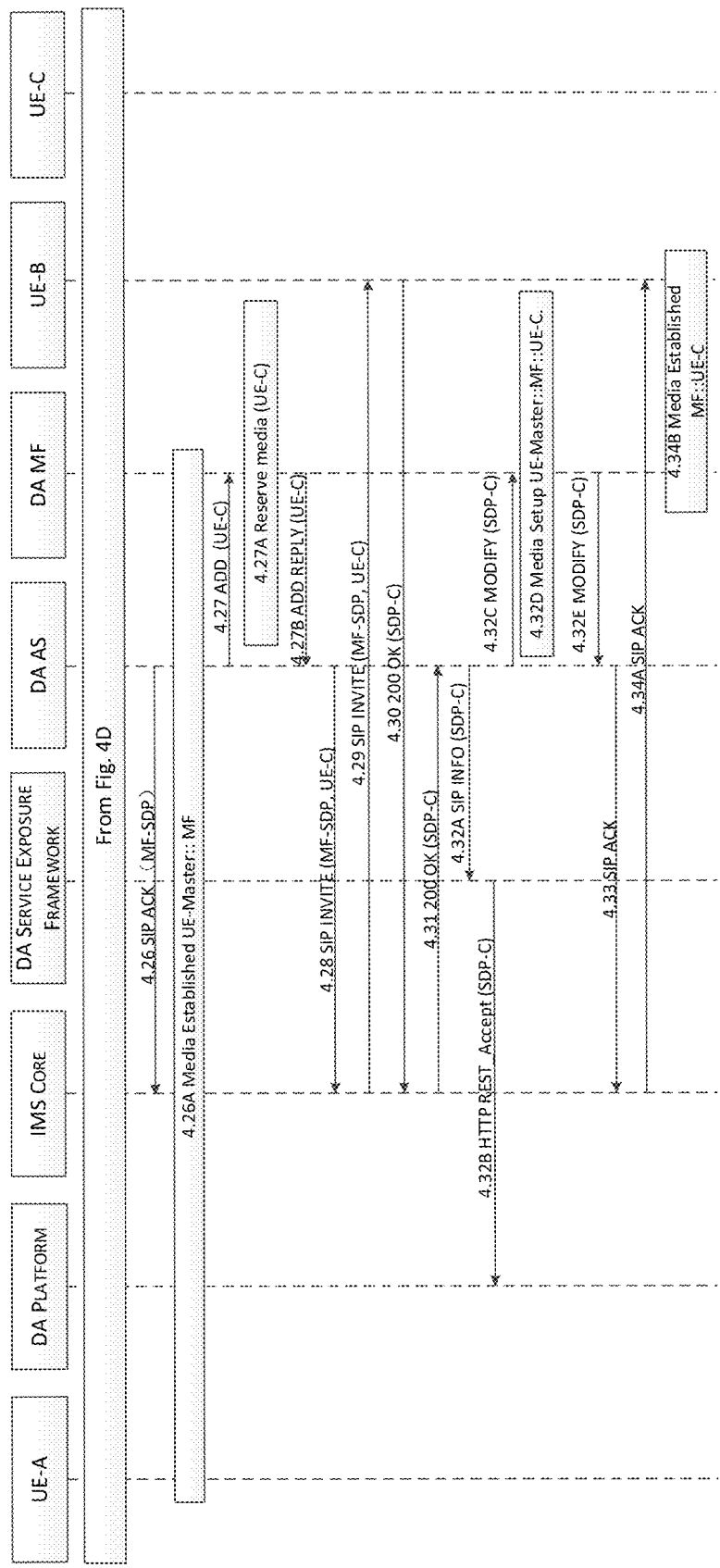

Accordingly, turning to FIG. 4D, at 4.25B, the DA MF notifies the status (e.g., insufficient resource or network congestion) to the DA AS with a NOTIFY message. At 4.25C, the DA AS instructs the DA MF to revoke the resources used for the call between UE-A and UE-B with a SUBTRACT command. At 4.25D, the DA MF removes the resources from UE-A and UE-B and informs this to the DA AS with a SUBTRACT REPLY response. At 4.25E, the DA AS sends a SIP BYE request to the IMS core, requesting it to release the resources used by UE-A and UE-B. At 4.25F: the IMS core sends the SIP BYE request to UE-B. At 4.25G, the IMS core also sends the SIP BYE request to UE-A. At 4.25H, UE-B may release the call and responds with a 200 OK towards the IMS core for the SIP BYE request. At 4.25J, UE-A may release the call and responds with a 200 OK towards the IMS core for the SIP BYE request. At 4.25K, the IMS core forwards the SIP BYE request to the DA service exposure framework to release the resources used by UE-A and UE-B. At 4.25L, the DA service exposure framework informs the releasing of resources for UE-A and UE-B to the DA platform. At 4.25M, The DA service exposure framework replies to the IMS core with a 200 OK response code informing that all resources for UE-A and UE-B have been released successfully. At 4.25N, the IMS core may reply to the DA AS with a 200 OK response code informing that all resources for UE-A and UE-B have been released successfully. At 4.25P, the DA MF reserves resources for UE-A and sends an ADD Reply to the DA AS. The subsequent steps 4.26~4.34B for establishing the call between UE-A and UE-C as shown in FIG. 4E are similar to the steps 4.9~4.17B as discussed above in connection with FIGS. 4A and 4B for establishing the call between UE-A and UE-B, and details thereof will be omitted here.

Figure 5:
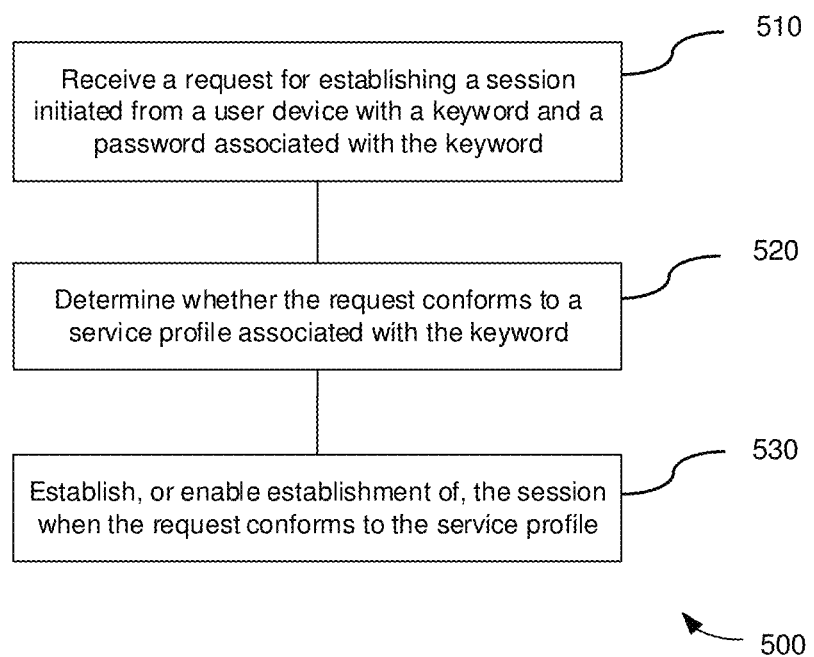
FIG. 5 is a flowchart illustrating a method for session control according to another embodiment of the present disclosure.

FIG. 5 is a flowchart illustrating a method 500 for session control according to another embodiment of the present disclosure. The method 500 can be performed at a network node, e.g., a DA MF or an IMS core in FIG. 1.

At block 510, a request for establishing a session is received, e.g., from a DA AS in FIG. 1. The session is initiated from a user device with a keyword. In an example, the keyword can be derived from a voice command.

At block 520, it is determined whether the request conforms to a service profile associated with the keyword.

At block 530, when the request conforms to the service profile, the session is established, or establishment of the session is enabled.

In an example, the keyword can be included in a set of user-defined keywords. For example, prior to the block 510, a configuration of the set of user-defined keywords can be received, e.g., from a DA AS in FIG. 1. Each of the set of user-defined keywords can be associated with a service profile specifying one or more services allowed to be initiated with that user-defined keyword. The services here may include e.g., voice call, video call, messaging, and the like.

In an example, the configuration may further indicate a password associated with each of the set of user-defined keywords. For example, the request received in the block 510 may contain a password associated with the keyword. Upon receiving the request in the block 510, the request can be authenticated based on the password.

In an example, the configuration may further indicate a validity period for each of the set of user-defined keywords. Accordingly, upon receiving the request in the block 510, it can be verified that the keyword is valid based on the validity period of the keyword.

If the request does not conform to the service profile, e.g., if the request is for a service not allowed to be initiated with the keyword, or if the authentication of the password fails, or if the keyword is not valid, the request can be rejected.

The method 500 will be explained in further detail below with reference to FIG. 6 and FIGS. 7A-7C.

Figure 6:
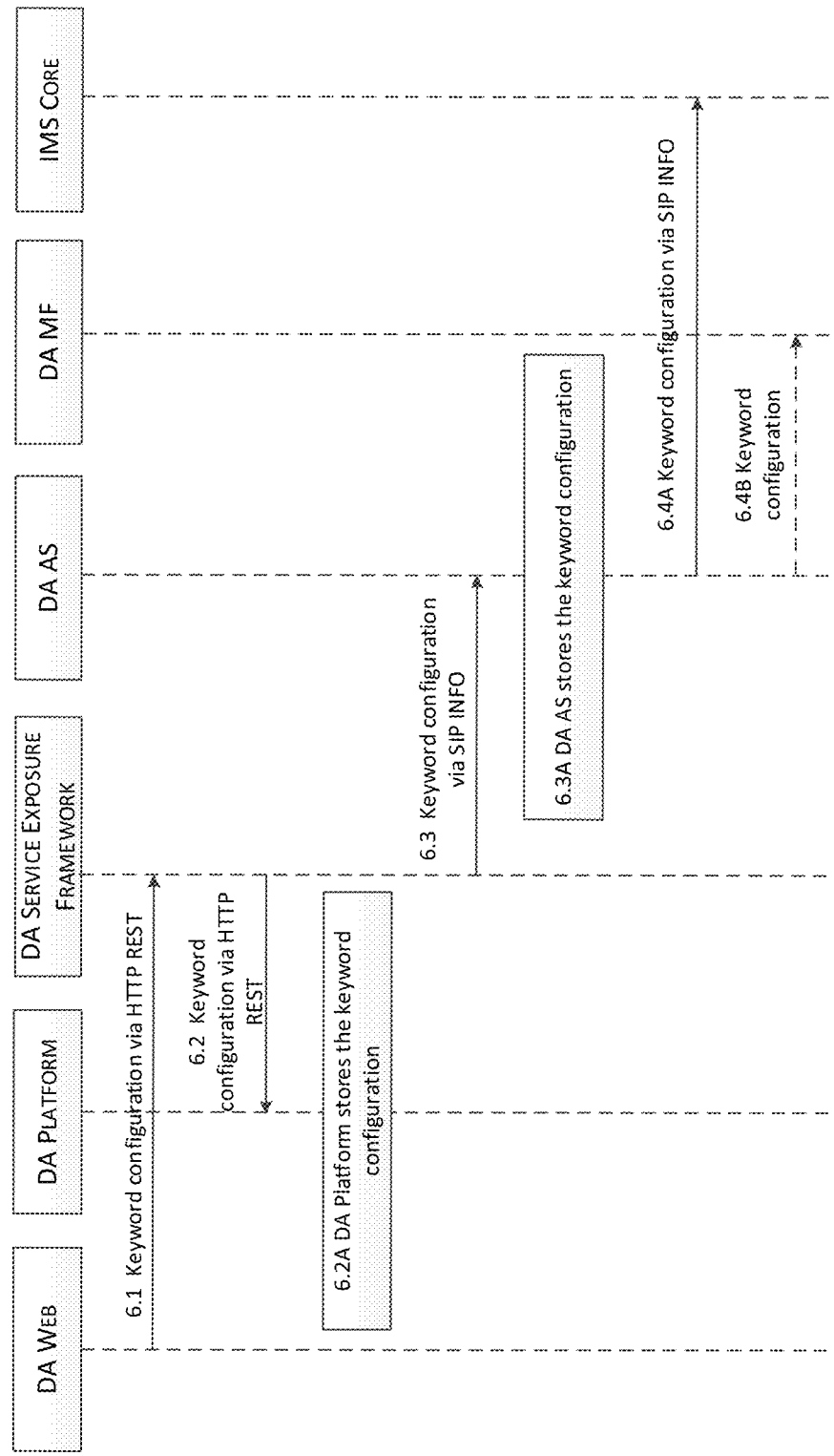
FIG. 6 is a sequence chart showing a keyword configuration process that can be used with the method shown in FIG. 5.

FIG. 6 is a sequence chart showing a keyword configuration process that can be used with the method 500.

In this example, a user (e.g., owner, referred to as "master user" hereinafter) of a DA-enabled smart device has registered to an IMS network. The master user can define a set of keywords of his/her choice and configure each keyword with a service profile specifying one or more services allowed to be initiated with that keyword. The master user can assign or distribute one or more of these keywords to other users (such as his/her friends or family members, referred to as "guest users" hereinafter). Each keyword may have an associated password which can be unique to that keyword, allowing a guest user to use his/her own smart device to invoke one or more services allowed by the associated service profile. The master user may also configure each keyword with a validity period, so that a DA platform may reject any instructions containing a particular keyword once its validity period has expired. The master user can register the keywords and their respective priorities and validity periods to the DA platform via a DA Web. The master user can access the DA Web using the smart device or any other appropriate web-enabled device.

As an example, Table 2 below illustrates a list of keywords created/configured by the master user, as well as their corresponding priorities and validity periods. One or more of these keywords may be assigned or distributed by the master user to guest users.

TABLE 2

Keyword Configuration

| Keyword | Service Profile | Password | Validity Period (seconds) |
|---|---|---|---|
| "Digital Assistant" | Voice, Video, Chat, Call-FWD | DA0000 | Infinite |
| "Systema" | Voice, Messaging | DA1111 | 3600 |
| "Elsa" | Voice | DA2222 | 60 |
| "Alpha" | Messaging | DA3333 | 50 |

At 6.1, the DA Web sends the keyword configuration, including the keywords and their respective service profiles, passwords, and validity periods, as shown in Table 2 to a DA service exposure framework via HTTP REST. At 6.2, the DA service exposure framework sends the keyword configuration to a DA platform via HTTP REST. At 6.2A, the DA platform stores the keyword configuration. At 6.3, the DA service exposure framework sends the keyword configuration to a DA AS via SIP INFO. At 6.3A, the DA AS stores the keyword configuration in order to prioritize resources and services to a user providing an instruction containing a high-priority keyword. At 6.4A, the DA AS sends the keyword configuration to an IMS core via SIP INFO. At 6.4B, the DA AS sends the keyword configuration to a DA MF via an H.248 Service Change Request. Then, the DA platform can invoke various services based on voice instructions from a user using any of the defined keywords.

Figure 7A:
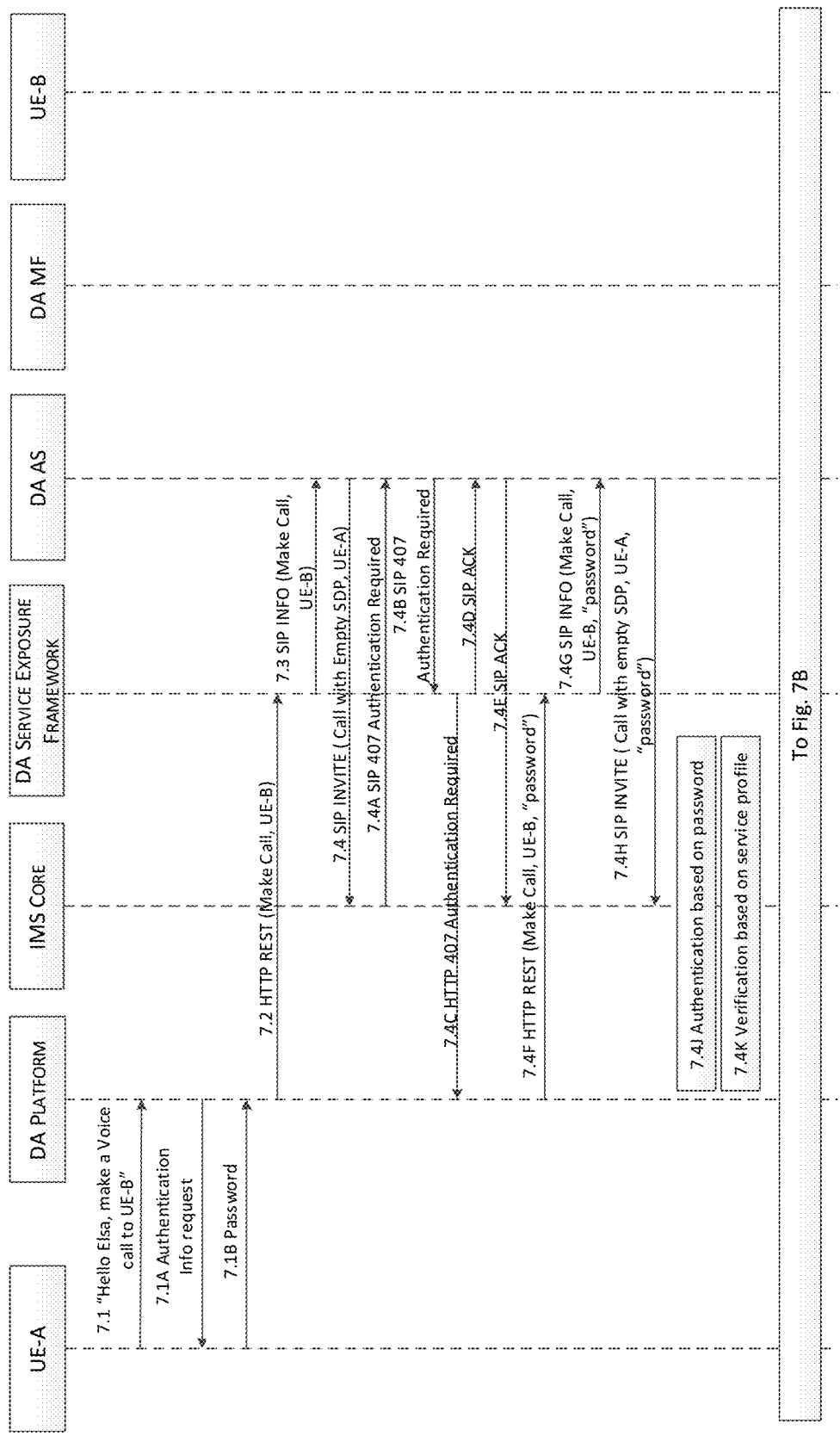
FIGS. 7A-7C are sequence charts showing a session establishment process based on the method shown in FIG. 5.
Figure 7B:
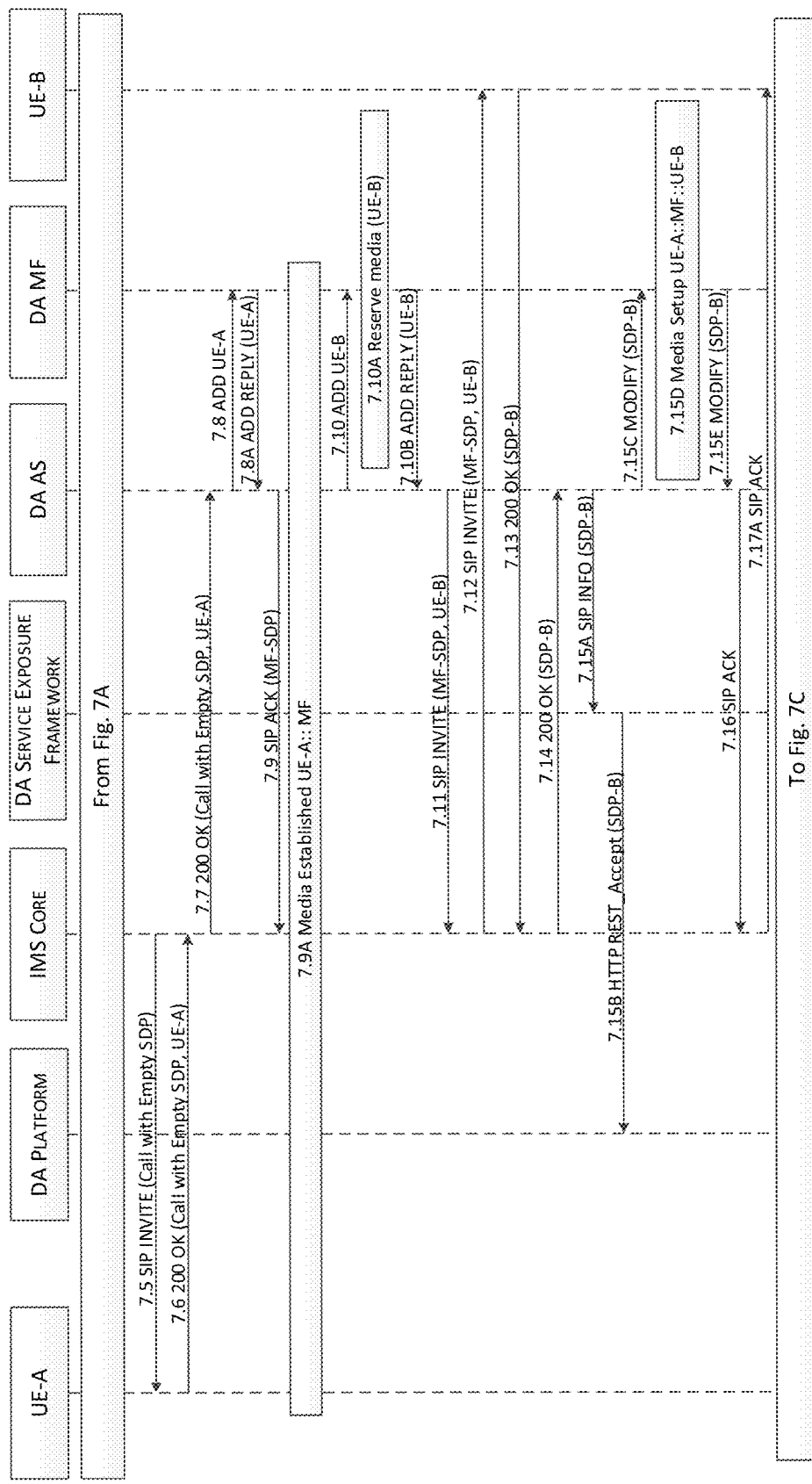
Figure 7C:
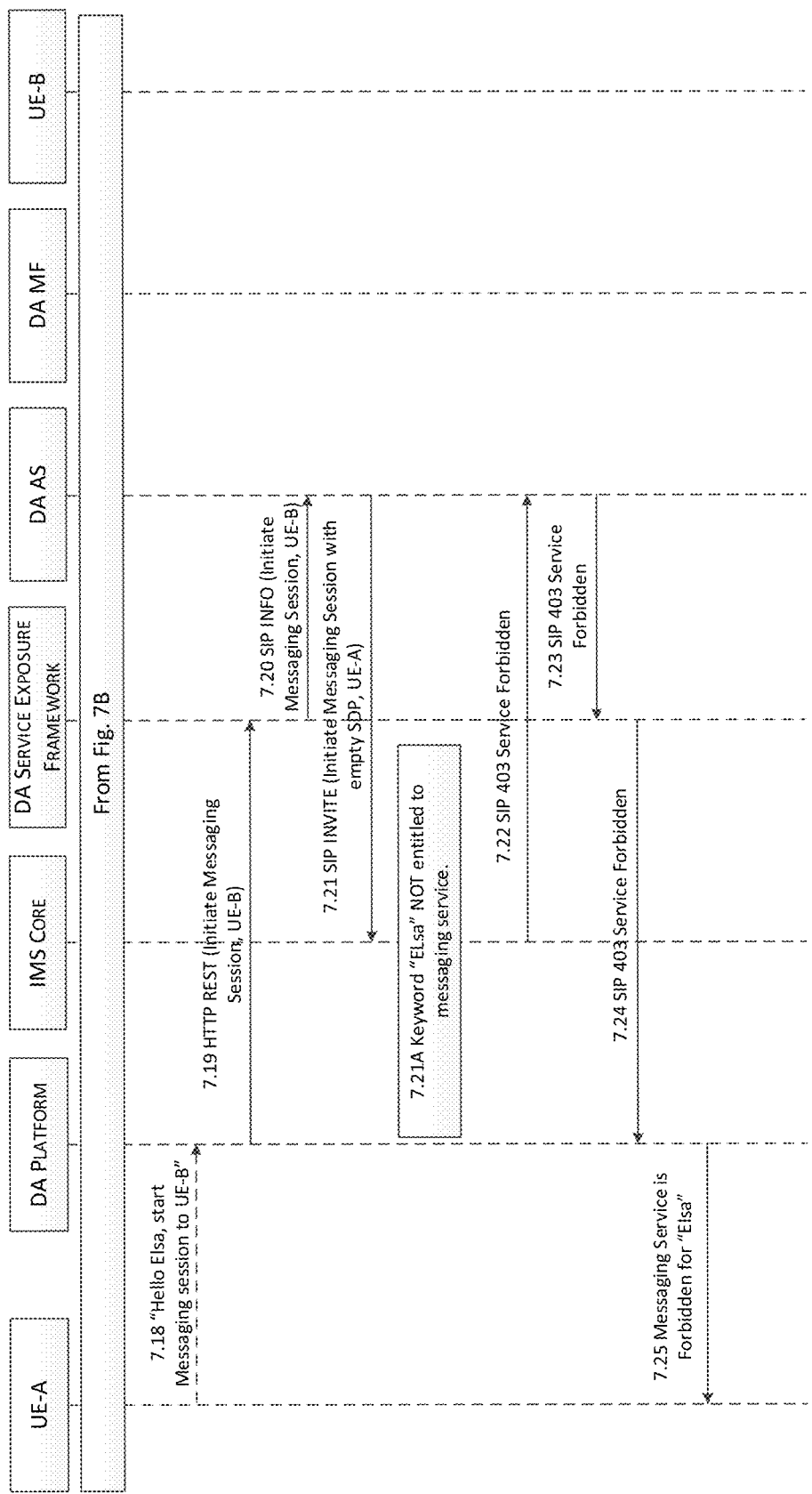

FIGS. 7A-7C are sequence charts showing a session establishment process based on the method 500, following the keyword configuration process shown in FIG. 6.

As shown in FIG. 7A, at 7.1, the smart device (which is a calling UE and denoted here as UE-A) receives from a user (e.g., a guest user) a voice command of "Hello Elsa, make a voice Call to UE-B" (here UE-B refers to a called UE), and sends the voice command to the DA platform. The voice command is carried over the media channel between UE-A and the DA platform. At 7.1A, the DA platform, which is already aware of the keyword configuration, detects the keyword "Elsa" and authenticates the voice command by requesting UE-A to provide the associated password. At 7.1B, the UE-A sends the password associated with the keyword "Elsa" to the DA platform. After the authentication, the DA platform translates the voice command to a text function and maps the voice command to a text and/or a JSON format. The text is then forwarded to the DA service exposure framework via a HTTP/REST API at 7.2, to initiate a voice call towards UE-B. At 7.3, the DA service exposure framework sends a SIP INFO message including the keyword "Elsa" and e.g., a telephone number of UE-B to the DA AS, instructing the DA AS to trigger a voice call to UE-B. At 7.4, the DA AS sends an empty SIP INVITE request containing the keyword "Elsa", without SIP body of UE-A, to the IMS core, which is aware of the keyword configuration. At 7.4A, the IMS core sends a SIP 407 response to the DA AS asking the proxy (i.e. the DA-Platform) to provide authentication details in order to access the IMS network. At 7.4B, the DA AS forwards the SIP 407 response to the DA service exposure framework. At 7.4C, the DA service exposure framework translates the SIP response to a HTTP/REST and forwards the HTTP 407 response to the DA platform, requesting for the authentication details. At 7.4D, the DA service exposure framework acknowledges the DA AS with a SIP Acknowledgement (ACK). At 7.4E, the DA AS may acknowledge the IMS core with a SIP ACK. At 7.4F, the DA platform triggers a HTTP REST request towards the DA service exposure framework, including the password associated with the keyword "Elsa". At 7.4G, the DA service exposure framework sends a SIP INFO message including the keyword "Elsa" and the password and the telephone number of UE-B, instructing the DA AS to trigger a voice call to UE-B. At 7.4H, the DA AS sends an empty SIP INVITE request including the keyword "Elsa" and the password, without SIP body of UE-A, to the IMS core, which is aware of the keyword configuration. At 7.4J, the IMS core authenticates UE-A and the keyword "Elsa" by verifying the password received from the DA AS. If the authentication is successful, the IMS core grants permission to UE-A to invoke the services that have been assigned for that specific keyword from the IMS core. However, if the authentication fails, the IMS core rejects the request and forbids UE-A from invoking those services that are not authorized for UE-A. The IMS core may have an option to store the passwords associated with the keywords in its local memory for a specified amount of time, so that any future request from the same UE (i.e., UE-A) and using the same keyword (i.e., "Elsa") does not need to be re-authenticated again. At 7.4K, the IMS core (in particular a Telephony Application Server (TAS) in the IMS core), which is aware of the keyword configuration, verifies that the request conforms to the service profile associated with the keyword "Elsa", e.g., by verifying that the requested service is allowed by the service profile. The IMS core (or TAS) may reject any request for a service not allowed by the service profile.

Turning to FIG. 7B, at 7.5, the IMS core forwards an empty SIP INVITE request towards UE-A, requesting UE-A to send SDP details. At 7.6, the UE-A responds to the request with a SIP 200 OK response including its own offered SDP media attributes. At 7.7, the IMS core verifies the SDP body of 200 OK and checks that the SDP contains session description information for VOICE calls only (as the keyword "Elsa" is only allowed to invoke voice call services) and then forwards the SIP 200 OK response including the SDP offer to the DA AS. At 7.8, the DA AS requests the DA MF to reserve a media resource for UE-A, e.g., via an ADD request. At 7.8A, the DA MF detects the keyword "Elsa", and reserves media resources for UE-A as requested by the DA AS, and informs the DA AS with an ADD Reply response at 7.8B. At 7.9, the DA AS forwards a SIP ACK message with SDP answer to the IMS core. At 7.9A, a media channel is established between UE-A and the DA MF. At 7.10, the DA AS request the DA MF to reserve a media resource for UE-B, e.g., via an ADD request. At 7.10A, the DA MF reserves a media resource for UE-B. At 7.10B, the DA MF responds with an ADD Reply to the DA AS, containing its local SDP. At 7.11, the DA AS triggers a SIP INVITE request towards the IMS core, containing the information about UE-B and the SDP received from the DA MF. At 7.12, the IMS core forwards the SIP INVITE request along with the SDP offer to UE-B for establishing a voice call session. At 7.13, UE-B responds with a SIP 200 OK response containing its own SDP as an answer to the IMS core for establishing the voice call session. At 7.14, the IMS core forwards the SIP 200 OK along with the SDP of UE-B to the DA AS. At 7.15A, the DA AS informs the DA service exposure framework about the supported SDP attributes of UE-B via a SIP INFO request. At 7.15B, the DA service exposure framework forwards the SDP attributes for voice call towards the DA platform using a REST/HTTP Accept message. The DA platform may have an option to store the passwords of the keywords in its local memory for a specified amount of time, such that any future request from the same user (i.e., UE-A) and using the same keyword (i.e., "Elsa") does not need to be re-authenticated again. At 7.15C, the DA AS sends a Modify request to the DA MF, requesting a media channel to be updated as per the remote SDP received from the IMS core at 7.14. At 7.15, the media topology in the DA MF may be updated and keyword detection may be set to a silence mode. At 7.15E, the DA MF updates the Media topology, then sets the media channel going towards the DA platform to be silenced and sends a Modify reply to the DA AS. At 7.16, the DA AS informs the successful update of the media channel and completes the SIP dialogue to the IMS core with a SIP ACK message. At 7.17A, the IMS core forwards the SIP ACK to UE-B and establishes a signaling connection. Then, the voice call is successfully established between UE-A and UE-B.

Turning to FIG. 7C, during the voice call session or after finishing the voice call session with UE-B, the user may desire to have a messaging session with UE-B so that he/she can send and/or receive messages to/from UE-B. However, the service profile associated with the keyword "Elsa" assigned to UE-A is only entitled to voice calls. Using the keyword "Elsa", UE-A can only invoke the voice call service from the IMS core. If UE-A tries to initiate a session for any service not allowed in the service profile, the session may be rejected by the network. In particular, at 7.18, UE-A receives a voice command of "Hello Elsa, start a messaging session with UE-B" from the user and sends the voice command to the DA platform. The voice command is carried over the media channel between the UE-A and the DA platform. Here, the DA platform has stored the password and authentication details for UE-A and the keyword "Elsa" at 7.4J and 7.15B. Therefore, the user and/or the keyword do not need to be re-authenticated by the DA platform or the IMS core. Then, the DA platform translates the voice command into a text function and maps the voice command to a text/JSON format. The text is then forwarded to the DA service exposure framework via a HTTP/REST API to initiate a messaging session towards UE-B. At 7.20, the DA service exposure framework sends a SIP INFO message including the keyword "Elsa" and e.g., a telephone number of UE-B to the DA AS, instructing the DA AS to trigger a messaging session to UE-B. At 7.21, the DA AS sends an empty SIP INVITE request including the keyword "Elsa", without SDP body of UE-A, to the IMS core. At 7.21A, the IMS core (TAS) determines that the service profile associated with the keyword "Elsa" does not allow initiation of a messaging session, and then initiates a procedure to reject the request of messaging service initiated from UE-A. At 7.22, the IMS core rejects the messaging service request and sends a SIP 403 Forbidden response to the DA AS. At 7.23, the DA AS forwards the SIP 403 Forbidden response to the DA service exposure framework. At 7.24, the DA service exposure framework forwards the decision of the IMS network to the DA platform with 403 response code over a REST/HTTP message. At 7.25, the DA platform informs the user of UE-A about the decision of the IMS core, e.g., by playing a voice message "Messaging service forbidden for "Elsa" in at UE-A. Similarly, when a user uses the keyword "Alpha" to initiate a voice call session, the voice call session request will be rejected by the IMS core.

Figure 8:
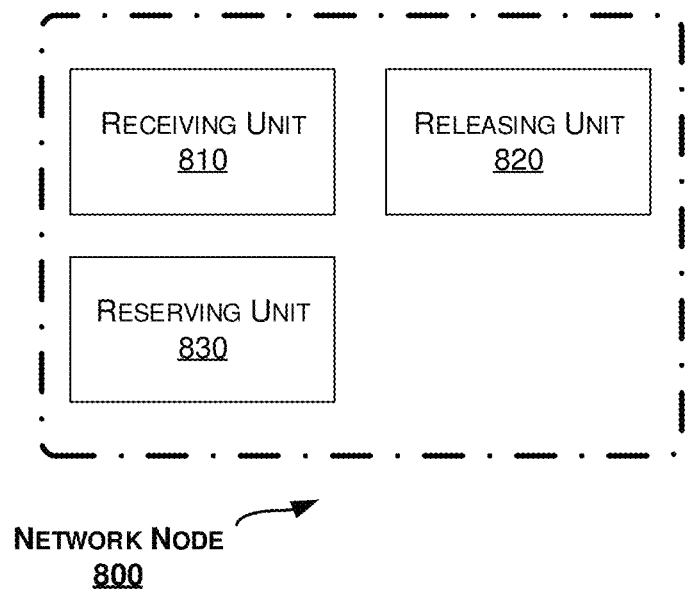
FIG. 8 is a block diagram of a network node according to an embodiment of the present disclosure.

Correspondingly to the method 200 as described above, a network node is provided. FIG. 8 is a block diagram of a network node 800 according to an embodiment of the present disclosure.

The network node 800 can be e.g., a DA MF in FIG. 1, and can be configured to perform the method 200 as described above in connection with FIG. 2. As shown in FIG. 8, the network node 800 includes a receiving unit 810 configured to receive a request for resource reservation for a first session initiated from a user device with a first keyword associated with a first priority. The network node 800 further includes a releasing unit 820 configured to release a resource for a second, ongoing session initiated from the user device with a second keyword associated with a second priority lower than the first priority. The network node 800 further includes a reserving unit 830 configured to reserve a resource for the first session.

In an embodiment, the receiving unit 810 can be further configured to receive a configuration of a set of user-defined keywords each associated with a priority. The first keyword and the second keyword can be included in the set of user-defined keywords.

In an embodiment, the configuration may further indicate a validity period for each of the set of user-defined keywords. The network node 800 can further include a verifying unit configured to verify that the first keyword is valid based on the validity period for the first keyword upon receiving the request.

In an embodiment, the resource for the second session may be released in response to determining that there is no sufficient resource to be reserved for the first session.

In an embodiment, each of the first keyword and the second keyword may be derived from a voice command.

The units 810~830 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 9:
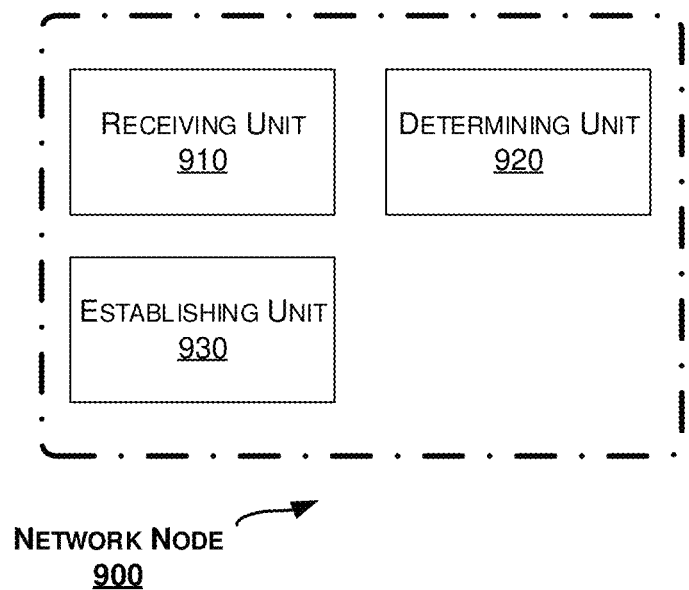
FIG. 9 is a block diagram of a network node according to another embodiment of the present disclosure.

Correspondingly to the method 500 as described above, a network node is provided. FIG. 9 is a block diagram of a network node 900 according to an embodiment of the present disclosure.

The network node 900 can be e.g., a DA MF or an IMS core in FIG. 1, and can be configured to perform the method 500 as described above in connection with FIG. 5. As shown in FIG. 9, the network node 900 includes a receiving unit 910 configured to receive a request for establishing a session initiated from a user device with a keyword. The network node 900 further includes a determining unit 920 configured to determine whether the request conforms to a service profile associated with the keyword. The network node 900 further includes an establishing unit configured to establish, or enable establishment of, the session when the request conforms to the service profile.

In an embodiment, the receiving unit 910 can be further configured to receive a configuration of a set of user-defined keywords each associated with a service profile specifying one or more services allowed to be initiated with that user-defined keyword. The keyword can be included in the set of user-defined keywords.

In an embodiment, the configuration may further indicate a password associated with each of the set of user-defined keywords. The network node 900 can further include an authenticating unit configured to authenticate the request based on the password.

In an embodiment, the configuration may further indicate a validity period for each of the set of user-defined keywords. The network node 900 can further include a verifying unit configured to verify that the keyword is valid based on the validity period of the keyword upon receiving the request.

In an embodiment, the keyword may be derived from a voice command.

The units 910~930 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5.

Figure 10:
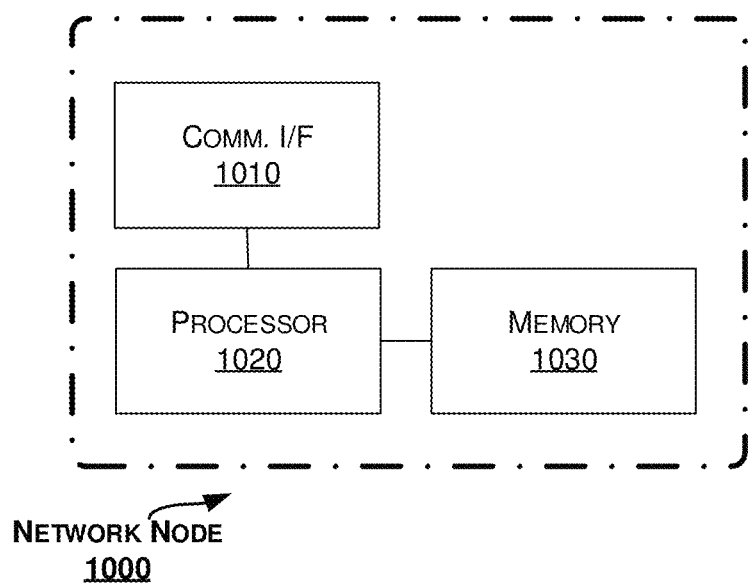
FIG. 10 is a block diagram of a network node according to another embodiment of the present disclosure.

FIG. 10 is a block diagram of a network node 1000 according to another embodiment of the present disclosure.

The network node 1000 includes a communication interface 1010, a processor 1020 and a memory 1030. The memory 1030 contains instructions executable by the processor 1020 whereby the network node 1000 is operative to perform the actions, e.g., of the procedure described earlier in conjunction with FIG. 2 or 5.

For example, the network node 1000 can be a DA MF in FIG. 1. Particularly, the memory 1030 can contain instructions executable by the processor 1020 whereby the network node 1000 is operative to: receive a request for resource reservation for a first session initiated from a user device with a first keyword associated with a first priority; release a resource for a second, ongoing session initiated from the user device with a second keyword associated with a second priority lower than the first priority; and reserve a resource for the first session.

In an embodiment, the memory 1030 can further contain instructions executable by the processor 1020 whereby the network node 1000 is operative to: receive a configuration of a set of user-defined keywords each associated with a priority. The first keyword and the second keyword can be included in the set of user-defined keywords.

In an embodiment, the configuration may further indicate a validity period for each of the set of user-defined keywords. The memory 1030 can further contain instructions executable by the processor 1020 whereby the network node 1000 is operative to: verify that the first keyword is valid based on the validity period for the first keyword upon receiving the request.

In an embodiment, the resource for the second session may be released in response to determining that there is no sufficient resource to be reserved for the first session.

In an embodiment, each of the first keyword and the second keyword may be derived from a voice command.

For example, the network node 1000 can be a DA MF or an IMS core in FIG. 1. Particularly, the memory 1030 can contain instructions executable by the processor 1020 whereby the network node 1000 is operative to: receive a request for establishing a session initiated from a user device with a keyword; determine whether the request conforms to a service profile associated with the keyword; and establish, or enable establishment of, the session when the request conforms to the service profile.

In an embodiment, the memory 1030 can further contain instructions executable by the processor 1020 whereby the network node 1000 is operative to: receive a configuration of a set of user-defined keywords each associated with a service profile specifying one or more services allowed to be initiated with that user-defined keyword. The keyword can be included in the set of user-defined keywords.

In an embodiment, the configuration may further indicate a password associated with each of the set of user-defined keywords. The memory 1030 can further contain instructions executable by the processor 1020 whereby the network node 1000 is operative to: authenticate the request based on the password.

In an embodiment, the configuration may further indicate a validity period for each of the set of user-defined keywords. The memory 1030 can further contain instructions executable by the processor 1020 whereby the network node 1000 is operative to: verify that the keyword is valid based on the validity period of the keyword upon receiving the request.

In an embodiment, the keyword may be derived from a voice command.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1020 causes the network node 1000 to perform the actions, e.g., of the procedure described earlier in conjunction with FIG. 2 or 5.

The computer program product may be configured as a computer program code structured in computer program modules. The computer program modules could essentially perform the actions of the flow illustrated in FIG. 2 or 5.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network node for session control, the method comprising:
 receiving a request for resource reservation for a first session initiated from a user device with a first keyword associated with a first priority;
 responsive to receiving the request for the resource reservation for the first session, releasing a resource for a second session initiated from the user device with a second keyword associated with a second priority that is lower than the first priority; and
 reserving a resource for the first session.

2. The method of claim 1, further comprising:
 receiving a configuration of a set of user-defined keywords each associated with a priority,
 wherein the first keyword and the second keyword are included in the set of user-defined keywords.

3. The method of claim 2, wherein the configuration further indicates a validity period for each of the set of user-defined keywords,
 the method further comprising:
  verifying that the first keyword is valid based on the validity period for the first keyword upon receiving the request.

4. The method of claim 1, wherein releasing the resource for the second session comprises releasing the resource for the second session in response to determining that there is no sufficient resource to be reserved for the first session.

5. The method of claim 1, further comprising:
 deriving each of the first keyword and the second keyword from at least one voice command.

6. A method in a network node for session control, the method comprising:
 receiving an indication of a plurality of keywords that are each associated with a service profile;
 receiving a request to establish a session initiated from a user device with a keyword that is included in the plurality of keywords;
 determining that the request to establish the session conforms to a service profile associated with the keyword; and establishing, or enabling establishment of, the session based on the request conforming to the service profile.

7. The method of claim 6, wherein receiving the indication of the plurality of keywords comprises receiving a configuration of a set of user-defined keywords each associated with a service profile specifying one or more services allowed to be initiated with that user-defined keyword, and
wherein the keyword is included in the set of user-defined keywords.

8. The method of claim 7, wherein the configuration further indicates a password associated with each of the set of user-defined keywords,
the method further comprising:
authenticating the request based on the password.

9. The method of claim 7, wherein the configuration further indicates a validity period for each of the set of user-defined keywords,
the method further comprising:
verifying that the keyword is valid based on the validity period of the keyword upon receiving the request.

10. The method of claim 6, wherein receiving the request to establish the session comprises deriving the keyword from a voice command.

11. A network node comprising:
a processor; and
a memory coupled to the processor, the memory comprising instructions executable by the processor to cause the network node to perform operations comprising:
receiving a request for resource reservation for a first session initiated from a user device with a first keyword associated with a first priority;
responsive to receiving the request for the resource reservation for the first session, releasing a resource for a second session initiated from the user device with a second keyword associated with a second priority that is lower than the first priority; and
reserving a resource for the first session.

12. The network node of claim 11, the operations further comprising:
receiving a configuration of a set of user-defined keywords each associated with a priority,
wherein the first keyword and the second keyword are included in the set of user-defined keywords.

13. The network node of claim 12, wherein the configuration further indicates a validity period for each of the set of user-defined keywords,
the method further comprising:
verifying that the first keyword is valid based on the validity period for the first keyword upon receiving the request.

14. The network node of claim 11, wherein releasing the resource for the second session comprises releasing the resource for the second session in response to determining that there is no sufficient resource to be reserved for the first session.

15. The network node of claim 11, the operations further comprising:
deriving each of the first keyword and the second keyword from at least one voice command.

16. A non-transitory computer-readable medium having instructions stored therein that are executable by processing circuitry to cause a network node to perform operations comprising:
receiving an indication of a plurality of keywords that are each associated with a service profile;
receiving a request to establish a session initiated from a user device with a keyword that is included in the plurality of keywords;
determining that the request to establish the session conforms to a service profile associated with the keyword; and
establishing, or enabling establishment of, the session based on the request conforming to the service profile.

17. The non-transitory computer-readable medium of claim 16, wherein receiving the indication of the plurality of keywords comprises receiving a configuration of a set of user-defined keywords each associated with a service profile specifying one or more services allowed to be initiated with that user-defined keyword, and
wherein the keyword is included in the set of user-defined keywords.

18. The non-transitory computer-readable medium of claim 17, wherein the configuration further indicates a password associated with each of the set of user-defined keywords,
the method further comprising:
authenticating the request based on the password.

19. The non-transitory computer-readable medium of claim 17, wherein the configuration further indicates a validity period for each of the set of user-defined keywords,
the method further comprising:
verifying that the keyword is valid based on the validity period of the keyword upon receiving the request.

20. The non-transitory computer-readable medium of claim 16, wherein receiving the request to establish the session comprises deriving the keyword from a voice command.

* * * * *